(12) United States Patent
Lim et al.

(10) Patent No.: US 7,694,032 B2
(45) Date of Patent: Apr. 6, 2010

(54) APPARATUS AND METHOD FOR CONTROLLING USB OPERATION

(75) Inventors: Jin-ho Lim, Suwon-si (KR); Tae-hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 11/746,130

(22) Filed: May 9, 2007

(65) Prior Publication Data

US 2008/0183909 A1    Jul. 31, 2008

(30) Foreign Application Priority Data

Jan. 25, 2007    (KR) ...................... 10-2007-0007909

(51) Int. Cl.
*G06F 13/10* (2006.01)
(52) U.S. Cl. ............................... 710/14; 710/8; 710/62
(58) Field of Classification Search ....................... None
See application file for complete search history.

(56) References Cited

U.S. PATENT DOCUMENTS

| 6,738,834 B1 | 5/2004 | Williams et al. |
| 2003/0054703 A1 | 3/2003 | Fischer et al. |
| 2005/0172139 A1* | 8/2005 | Kanai ........................ 713/189 |

FOREIGN PATENT DOCUMENTS

| EP | 1 441 278 A2 | 7/2004 |
| JP | 11-194993 | 7/1999 |
| JP | 2005-259073 | 9/2005 |
| KR | 2001-19478 | 3/2001 |

OTHER PUBLICATIONS

"iPod Features Guide", posted to Apple Support website Mar. 29, 2006, pp. 1-72.
Search Report issued Dec. 27, 2007 by the European Patent Office for European Patent Application No. 07114061.0-2212.

* cited by examiner

*Primary Examiner*—Ilwoo Park
(74) *Attorney, Agent, or Firm*—Jefferson IP Law, LLP

(57) ABSTRACT

An apparatus and method for controlling a USB operation, whereby the USB operation can be controlled without unplugging a USB cable while maintaining a charge state from a host device. The USB apparatus includes a USB connector to which a USB cable connected to a host device is connected, and a switching unit to switch to one of a first operation mode, in which data communication with the host device is enabled, and a second operation mode, in which an operation depending on a user input is enabled and data communication with the host device is disabled, by controlling power lines and data lines of the USB cable via the USB connector, wherein power can be charged from the host device in both the first operation mode and the second operation mode. Accordingly, a user can switch a USB operation mode without unplugging the USB cable.

26 Claims, 6 Drawing Sheets

APPARATUS AND METHOD FOR CONTROLLING USB OPERATION

CROSS-REFERENCE TO RELATED APPLICATION

This application claims the benefit of Korean Patent Application No. 2007-7909, filed in the Korean Intellectual Property Office on Jan. 25, 2007, the disclosure of which is incorporated herein by reference.

BACKGROUND OF THE INVENTION

1. Field of the Invention

Aspects of the present invention relate to an apparatus and method for controlling a Universal Serial Bus (USB) operation and, more particularly, to an apparatus and method for controlling a USB operation, whereby the USB operation can be controlled without unplugging a USB cable while maintaining a charge state from a host device.

2. Description of the Related Art

FIG. 1 illustrates a Universal Serial Bus (USB) apparatus connected to a host device via a USB cable. A USB apparatus 100 is connected to a host device 150 via a USB cable 130. The USB apparatus 100 includes a USB connector 120 to which the USB cable 130 connected to the host device 150 is connected and a controller 110 including a USB controller (not shown) to determine whether the USB cable 130 is connected to the USB connector 120.

FIG. 2A illustrates the USB cable 130. FIG. 2B illustrates a structure of USB plug pins. The USB cable 130 includes a pair of data lines D+ and D− for transferring a differential signal and a pair of power lines $V_{BUS}$ and GND. The voltage of $V_{BUS}$ is generally around +5 V. As illustrated in FIG. 2B, the pins for the power lines $V_{BUS}$ and GND are longer than the pins for the data lines D+ and D−. Thus, when the USB cable 130 is plugged in, power is supplied before the data lines D+ and D− are connected. When the USB cable 130 is unplugged, the data lines D+ and D− are disconnected before the power is cut off so as to prevent damage to the USB apparatus 100.

In order to communicate with the host device 150 using the USB apparatus 100, a user must connect the USB cable 130 to the USB connector 120 and the host device 150. The controller 110 determines that power is input through the USB cable 130 and controls the communication using the data lines D+ and D−. When the user unplugs the USB cable 130, the controller 110 determines that the USB connection is released.

The user must plug or unplug the USB cable 130 into or from the USB apparatus 100 for establishing or discontinuing the USB connection. The USB apparatus 100 cannot be used while the USB connection with the host device 150 is maintained; for example, an application or Audio and/or Video (A/V) data stored in the USB apparatus 100 cannot be executed while the USB connection is maintained.

Typically, a port of the USB apparatus 100 into which the USB cable 130 is plugged is used as a port into which a power adapter is plugged. In order to charge the USB apparatus 100, either the user must plug the power adapter into the USB apparatus 100 after unplugging the USB cable 130 from the USB apparatus 100, or the USB apparatus 100 must forcefully release communication with the host device 150 in a state where the USB cable 130 is connected between the USB apparatus 100 and the host device 150. However, in order to communicate between the USB apparatus 100 and the host device 150 again, the user must either plug the USB cable 130 into the USB apparatus 100 after unplugging the power adapter from the USB apparatus 100 in the former situation, or the user must unplug the USB cable 130 from the USB apparatus 100 and plug the USB cable 130 into the USB apparatus 100 again in the latter situation. In order for the user to use the USB apparatus 100, the user must repeatedly plug and unplug the USB cable 130, resulting in inconvenience of use.

SUMMARY OF THE INVENTION

Aspects of the present invention provide an apparatus and method for controlling a Universal Serial Bus (USB) operation, whereby a USB operation mode can be controlled without unplugging a USB cable while maintaining a charge state from a host device.

According to an aspect of the present invention, a Universal Serial Bus (USB) apparatus is provided. The USB apparatus comprises a USB connector to which a USB cable connected to a host device is connected; and a switching unit to switch to one of a first operation mode, in which data communication with the host device is enabled, and a second operation mode, in which an operation depending on a user input is enabled and data communication with the host device is disabled, by controlling power lines and data lines of the USB cable via the USB connector, wherein power can be charged from the host device in both the first operation mode and the second operation mode.

According to another aspect of the present invention, then the switching unit switches from the first operation mode to the second operation mode, the data lines are disconnected, and after a predetermined time period elapses, the power lines may be disconnected, and once the data lines and the power lines have been disconnected, a signal for re-connecting the power lines is output.

According to another aspect of the present invention, when the switching unit switches from the second operation mode to the first operation mode, the power lines are disconnected, a signal for re-connecting the power lines is output if the power lines have been disconnected, and after a signal to connect the data lines may be output after a predetermined time period elapses.

According to another aspect of the present invention, the USB apparatus further comprises a user input unit to receive a user input signal, wherein the switching unit switches an operation mode by controlling the power lines and the data lines of the USB cable according to an operation mode selected by the user input signal.

According to another aspect of the present invention, a USB apparatus is provided. The USB apparatus comprises a USB connector to which a USB cable connected to the host device is connected; a switching unit to control power lines and data lines of the USB cable via the USB connector; and a controller to control the switching unit to switch to one of a first operation mode, in which data communication with a host device is enabled, and a second operation mode, in which an operation depending on a user input is enabled; wherein power can be charged from the host device in both the first operation mode and the second operation mode.

According to another aspect of the present invention, the USB apparatus further comprises a user input unit to receive a user input signal, wherein the controller controls the switching unit according to an operation mode selected by the user input signal.

According to another aspect of the present invention, the controller controls the switching unit to switch to an operation mode when a predetermined condition is satisfied.

According to another aspect of the present invention, the controller determines that the predetermined condition is satisfied if the data lines are not used for a predetermined time period while in the first operation mode.

According to another aspect of the present invention, the controller determines that the predetermined condition is satisfied if a predetermined time period elapses.

According to another aspect of the present invention, a method of controlling a USB operation is provided. The method comprises selecting one of a first operation mode, in which data communication with a host device is enabled, and a second operation mode, in which an operation depending on a user input is enabled and data communication with the host device is disabled; and switching to the selected operation mode by controlling power lines and data lines of the USB cable, wherein power can be charged from the host device in both the first operation mode and the second operation mode.

According to another aspect of the present invention, a computer readable recording medium storing a computer readable program to execute a method of controlling a USB operation is provided. The method comprises selecting one of a first operation mode, in which data communication with a host device is enabled, and a second operation mode, in which an operation depending on a user input is enabled and data communication with the host device is disabled; and switching to the selected operation mode by controlling power lines and data lines of the USB cable, wherein power can be charged from the host device in both the first operation mode and the second operation mode.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
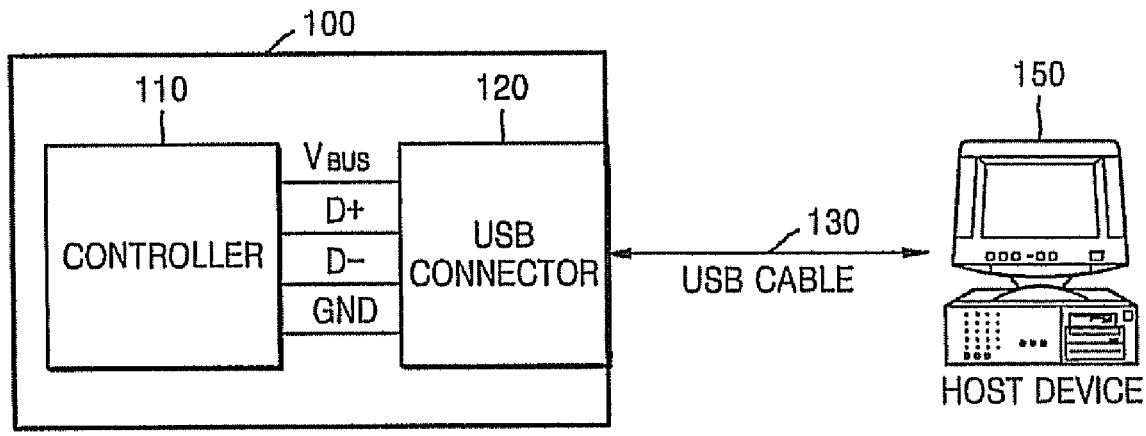
FIG. 1 illustrates a Universal Serial Bus (USB) apparatus connected to a host device via a USB cable.
Figure 2A:
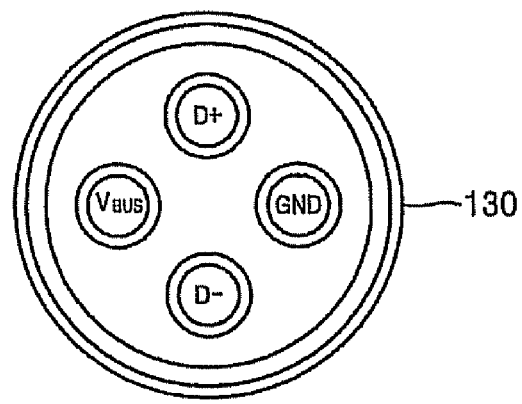
FIG. 2A illustrates a USB cable and FIG. 2B illustrates a structure of USB plug pins.
Figure 2B:
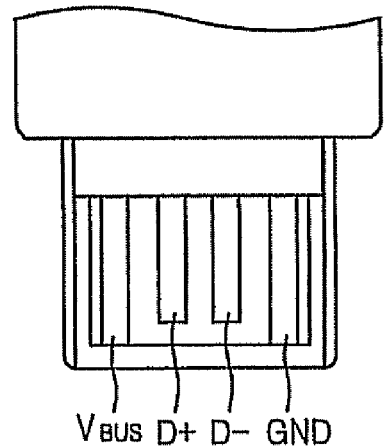

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
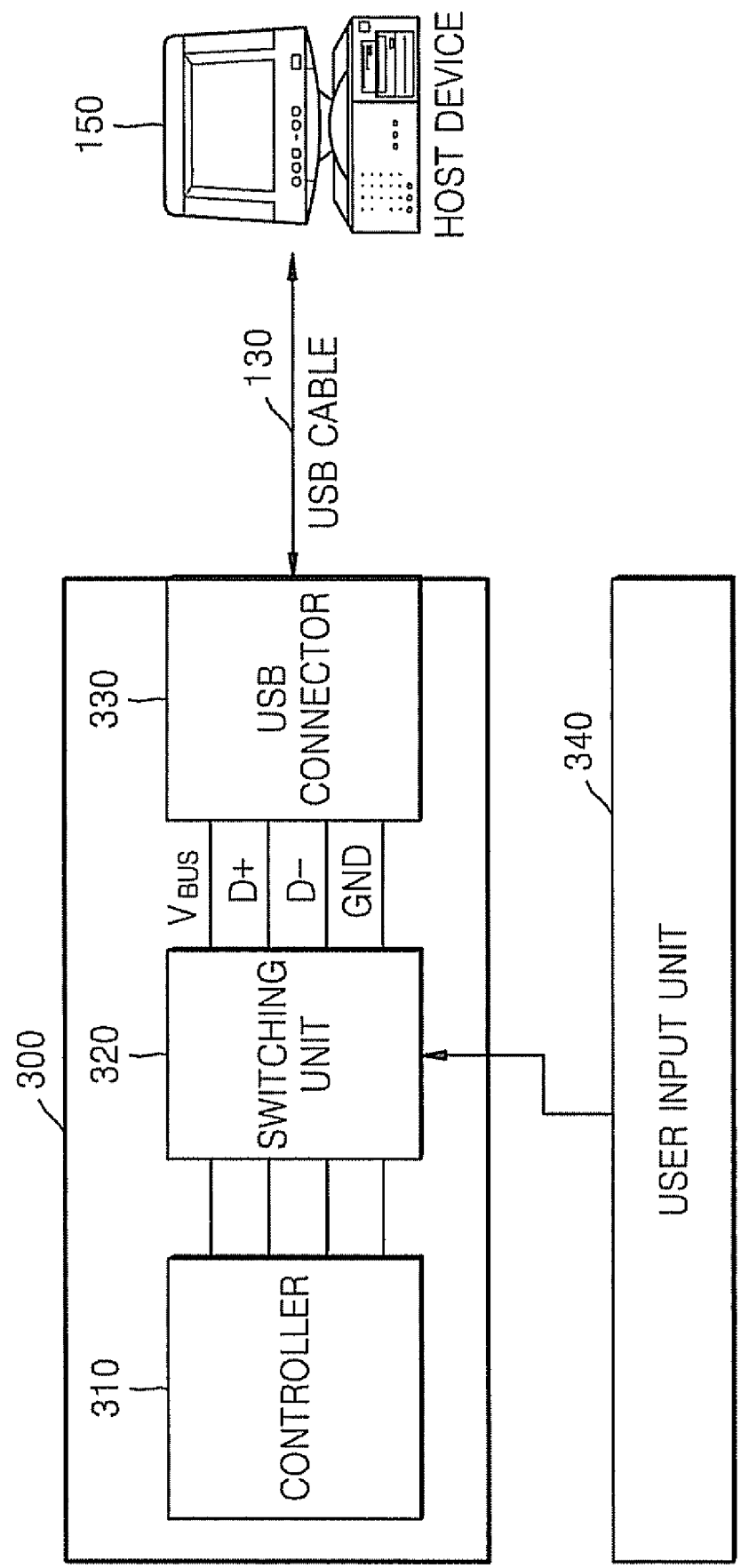
FIG. 3 illustrates a USB apparatus connected to a host device via a USB cable according to an embodiment of the present invention.

FIG. 3 is a USB apparatus 300 connected to a host device 150 via a USB cable 130 according to an embodiment of the present invention. The USB apparatus 300 includes a controller 310, a switching unit 320, and a USB connector 330. While not required in all aspects, the shown USB apparatus 300 includes a user input unit 340. The user input unit 340 may include a keypad for setting an operation mode and a selection button for operation mode selection. Other aspects of the invention may include other types of user input units, such as a touchpad, a click wheel, a touch screen display, a microphone, or other device capable of receiving user input. The host device may be any device able to communicate data with the USB apparatus 300, such as a computer (desktop or portable), set-top box, telephone, or mobile device.

The USB apparatus 300 may be a multimedia reproduction apparatus, such as an MP3 player or a Personal Multimedia Player (PMP), connected to the host device 150 via the USB cable 130. The USB apparatus 300 can be implemented as a cradle into which a multimedia reproduction apparatus can be plugged. According to other aspects of the invention, the USB apparatus can be any device with a USB connection, such as a portable computer, digital camera, mobile phone, personal entertainment device, storage medium (such as a Flash drive), or a personal digital assistant. The cradle can be configured in various forms, such as a speaker, according to functions of the cradle and/or the USB apparatus 300.

The controller 310 controls a general operation of the USB apparatus 300. The controller 310 performs communication with the host device 150 based on the USB standard. When the USB apparatus 300 is implemented in the form of a cradle, the controller 310 may be a function unit existing in another USB apparatus (e.g., a multimedia reproduction apparatus, not shown) plugged into the cradle. While not limited thereto, the USB standard may be version 1.1, 2.0, or other versions.

An operation mode of the USB apparatus 300 according to an embodiment of the present invention includes a first operation mode and a second operation mode. In the first operation mode, data communication with the host device 150 is enabled. In the second operation mode, second operation mode an operation depending on a user input is enabled. Power can be charged from the host device 150 in both the first operation mode and the second operation mode. Other aspects of the invention may include additional operation modes.

When a conventional USB apparatus 100 (shown in FIG. 1) reproduces data or displays a menu according to a user input signal while the conventional USB apparatus 100 is disconnected from the host device 150, both the data lines D+ and D− and the power lines $V_{BUS}$ and GND are disconnected from the host device 150. When the conventional USB apparatus performs an operation according to a user input signal in a state where the conventional USB apparatus 100 is disconnected from the host device 150, power must be charged by plugging a separate power adapter into the conventional USB apparatus 100. However, the second operation mode of the USB apparatus 300 according to an embodiment of the present invention is distinguished from a conventional operation mode in that an operation besides data communication with the host device 150 can be performed while charging power.

The switching unit 320 switches an operation mode by controlling the power lines $V_{BUS}$ and GND and the data lines D+ and D− of the USB cable 130 via the USB connector 330. The switching unit 320 can select the first operation mode, in which data communication with the host device 150 is enabled, or the second operation mode, in which an operation depending on a user input is enabled, according to a user input signal input from the user input unit 340.

The USB cable 130 connected to the host device 150 is connected to the USB connector 330. The power lines $V_{BUS}$ and GND and the data lines D+ and D− of the USB cable 130 connected to the USB connector 330 are controlled according to a control signal from the controller 310 and an operation mode switching signal from the switching unit 320.

Figure 4:
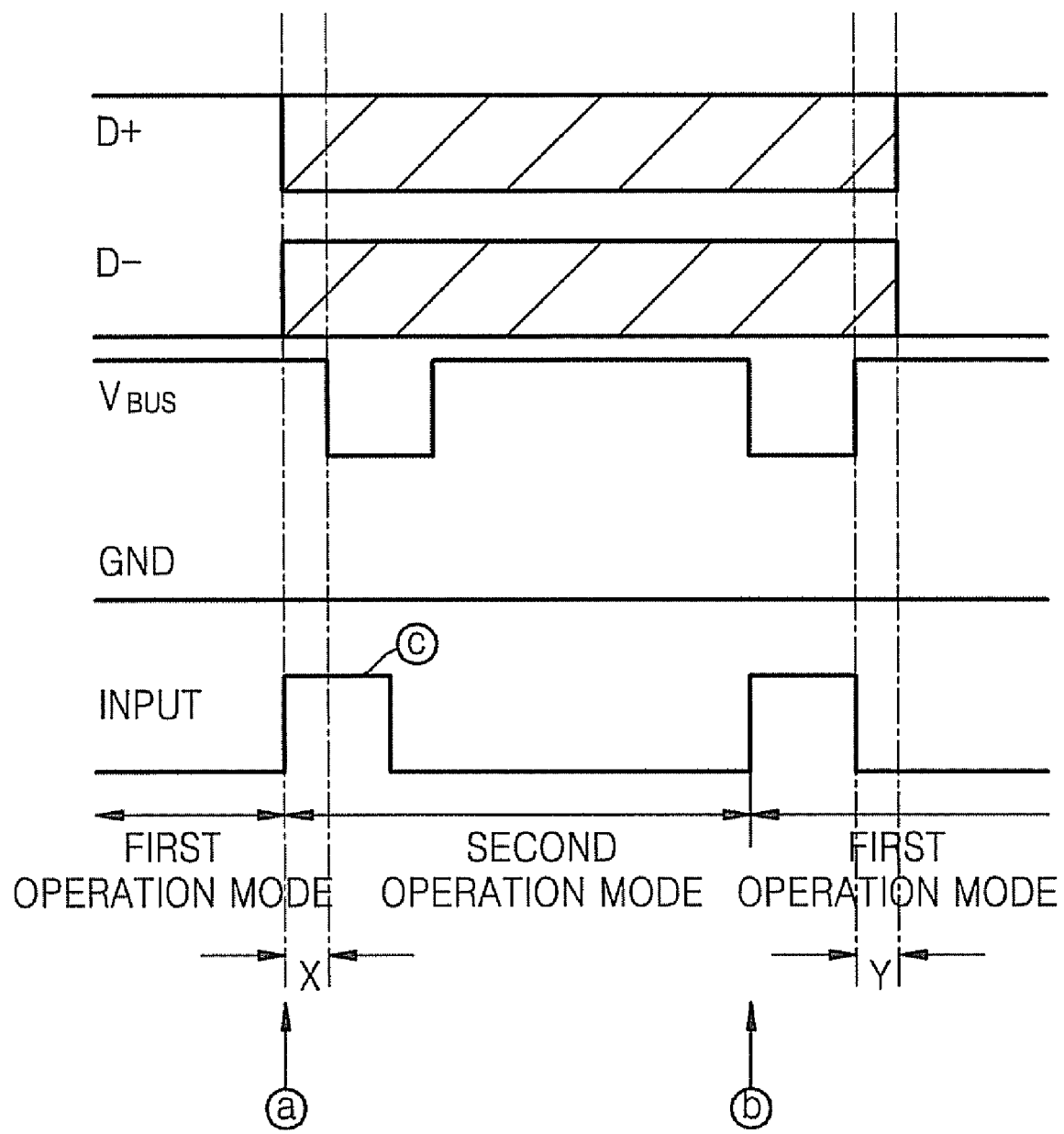
FIG. 4 illustrates signal waveforms output from a switching unit included in a USB apparatus according to an embodiment of the present invention.

A method of switching an operation mode according to an aspect of the invention by the switching unit 320 controlling the power lines $V_{BUS}$ and GND and the data lines D+ and D− of the USB cable 130 will now be described in detail with reference to FIG. 4. FIG. 4 illustrates signal waveforms output from the switching unit 320 included in the USB apparatus 300 according to an embodiment of the present invention.

As illustrated in FIG. 4, the USB apparatus 300 is in the first operation mode for data communication with the host device 150 and for charging power from the host device 150. If a user input signal requesting to switch from the first operation mode to the second operation mode is input at ⓐ, the switching unit 320 disconnects the data lines D+ and D−. The slashed portion of waveforms of the data lines D+ and D− indicates that the data lines D+ and D− are disconnected. The user input signal is maintained high for a predetermined time at ⓒ to allow time for the controller 310 to recognize the user input signal. Other aspects of the invention may utilize a different waveform; for example, the user input signal may not need to be maintained high for a long period of time if the controller 310 is more sensitive.

The switching unit 320 disconnect the power lines $V_{BUS}$ and GND after a predetermined time X elapses. The power lines $V_{BUS}$ and GND are disconnected after the predetermined time X elapses from when the data lines D+ and D− are disconnected to prevent damage to a system of the USB apparatus 300.

If the controller 310 determines that the data lines D+ and D− and the power lines $V_{BUS}$ and GND have been disconnected, the switching unit 320 outputs a signal to re-connect the power lines $V_{BUS}$ and GND to the host device 150 in order to charge power from the host device 150. By controlling output signals for the data lines D+ and D− and the power lines $V_{BUS}$ and GND of the USB cable 130, power can be charged via the USB cable 130 while operating the USB apparatus 300 without unplugging the USB cable 130. As shown, the $V_{BUS}$ is at +5V.

If a user input signal to select the first operation mode is received at ⓑ during the second operation mode, the switching unit 320 disconnects the power lines $V_{BUS}$ and GND. If the controller 310 determines that the power lines $V_{BUS}$ and GND have been disconnected, the switching unit 320 outputs a signal to re-connect the power lines $V_{BUS}$ and GND to the host device 150. After a predetermined time Y elapses, the switching unit 320 outputs a signal to re-connect the data lines D+ and D− to the host device 150. The reason for the delay time of the predetermined time Y after the power lines $V_{BUS}$ and GND are connected is to prevent damage to the system of the USB apparatus 300. The power lines $V_{BUS}$ and GND are disconnected and re-connected when switching from the second operation mode to the first operation mode so as to notify the host device 150 that the USB apparatus 300 is connected when the USB apparatus 300 is connected to the host device 150. By controlling the power lines $V_{BUS}$ and GND in the switching unit 320, switching to the first operation mode can be performed without unplugging the USB cable 130 while continuing to charge the USB apparatus 300.

By controlling the output signals for the data lines D+ and D− and the power lines $V_{BUS}$ and GND of the USB cable 130, the USB apparatus 300 can perform data communication with the host device 150 and charge power via the USB cable 130 without repeatedly unplugging and plugging the USB cable 130 for initialization of the USB apparatus 300.

Figure 5:
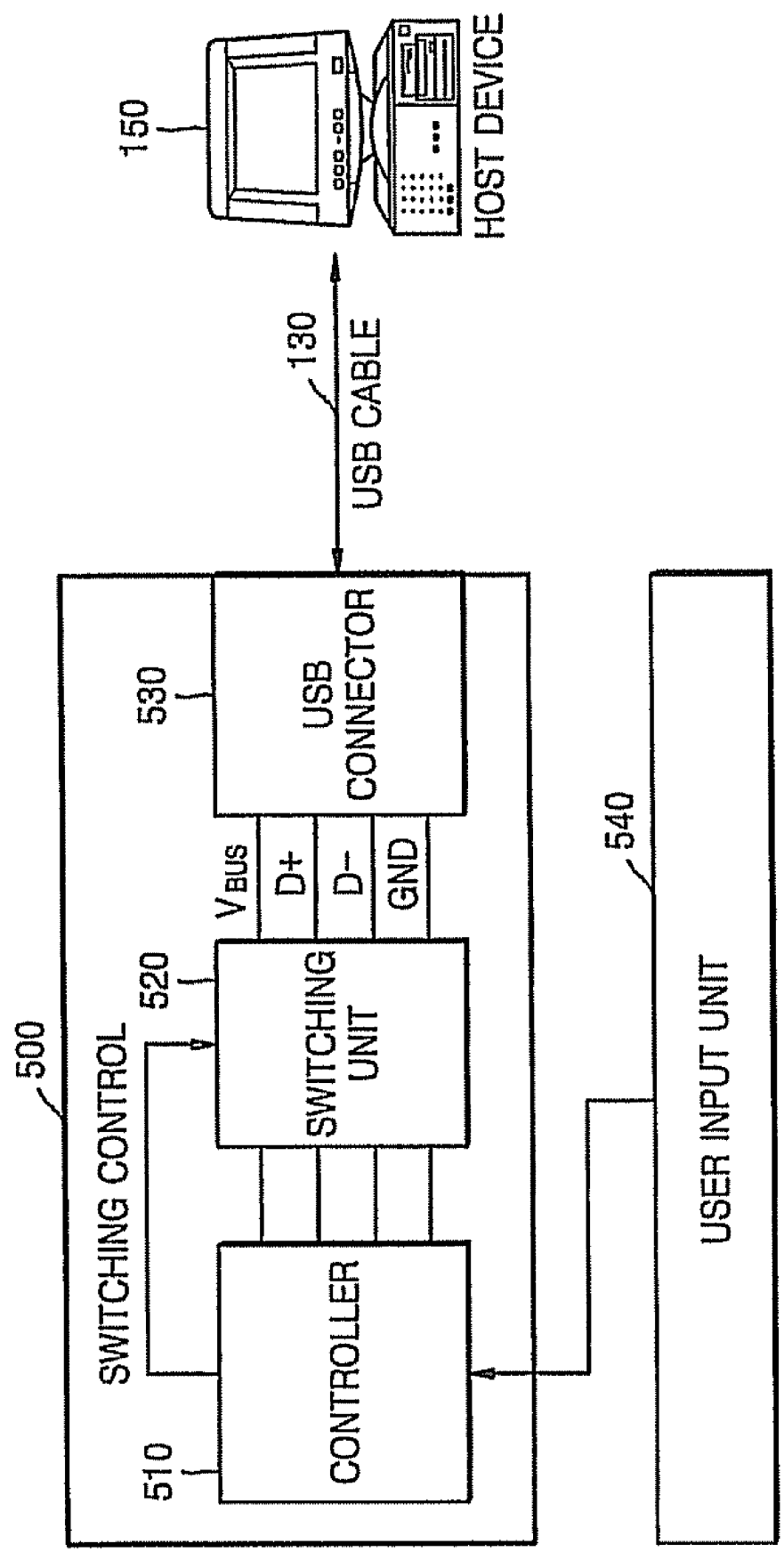
FIG. 5 illustrates a USB apparatus connected to a host device via a USB cable according to another embodiment of the present invention.

FIG. 5 illustrates a USB apparatus 500 connected to a host device 150 via a USB cable 130 according to another embodiment of the present invention. The USB apparatus 500 includes a controller 510, a switching unit 520, and a USB connector 530. The USB apparatus 500 can further include a user input unit 540. The USB apparatus 500 is distinguished from the USB apparatus 300 illustrated in FIG. 3 in that the switching unit 520 is controlled by the controller 510. Basic functions of the other components are the same as the USB apparatus 300 illustrated in FIG. 3. In addition, an operation mode is also switched according to the waveforms illustrated in FIG. 4.

The controller 510 selects one of the first operation mode, in which data communication with the host device 150 is enabled, and the second operation mode, in which an operation depending on a user input is enabled. In order to switch to an operation mode selected according to a control signal of the controller 510, the switching unit 520 controls power lines $V_{BUS}$ and GND and data lines D+ and D− of the USB cable 130 via the USB connector 530. The controller 510 can control the switching unit 520 using General Purpose Input/Output (GPIO), by way of example.

When switching from the first operation mode to the second operation mode, the controller 510 controls the switching unit 520 to disconnect the data lines D+ and D− and to disconnect the power lines $V_{BUS}$ and GND after the predetermined time X elapses. After the controller 510 determines that the data lines D+ and D− and the power lines $V_{BUS}$ and GND have been disconnected, the controller 510 controls the switching unit 520 to output a signal to re-connect the power lines $V_{BUS}$ and GND.

When switching from the second operation mode to the first operation mode, the controller 510 controls the switching unit 520 to disconnect the power lines $V_{BUS}$ and GND. After the controller 510 determines that the power lines $V_{BUS}$ and GND have been disconnected, the controller 510 controls the switching unit 520 to output a signal to re-connect the power lines $V_{BUS}$ and GND. After the predetermined time Y elapses, the controller 510 controls the switching unit 520 to output a signal to connect the data lines D+ and D−.

The user input unit 540 receives a user input signal and transmits the user input signal to the controller 510. The controller 510 controls the switching unit 520 to control the power lines $V_{BUS}$ and GND and the data lines D+ and D− according to an operation mode selected by the user input signal. While shown as connected, it is understood that that the input unit 340 or 540 can be detachable, such as when a user interface of a portable device is used, or a remote control remotely issues the user input signal.

The controller 510 can control the switching unit 520 to switch operation modes if a predetermined condition is satisfied. Switching operation modes upon satisfying a predetermined condition can be called automatic switching mode setting. For example, if the controller 510 determines that the data lines D+ and D− have not been used for a predetermined period of time after data communication with the host device 150 was finished, the controller 510 can control the switching unit 520 to switch from the first operation mode to the second operation mode. During the first operation mode, the controller 510 determines whether the data lines D+ and D− are being used. If the data lines D+ and D− are not used, the controller 510 can control the switching unit 520 to switch from the first operation mode to the second operation mode. A user can set the USB apparatus 500 so that the controller 510 operates as described above.

When switching to the second operation mode, the user can set an automatic switching mode in which predetermined multimedia content (for example, most recently downloaded content) stored in a storage unit (not shown) of the USB apparatus 500 is reproduced. By decoding and outputting content using a decoding module (not shown) and an output unit (not shown) included in the USB apparatus 500, such as a speaker and a display unit, the user can easily perceive that data communication between the USB apparatus 500 and the host device 150 has completed.

The user can set setting information of the USB apparatus 500 to change operation modes when a predetermined time period elapses. In this case, when the predetermined time period elapses, the USB apparatus 500 can switch from the first operation mode (or the second operation mode) to the second operation mode (or the first operation mode).

Figure 6:
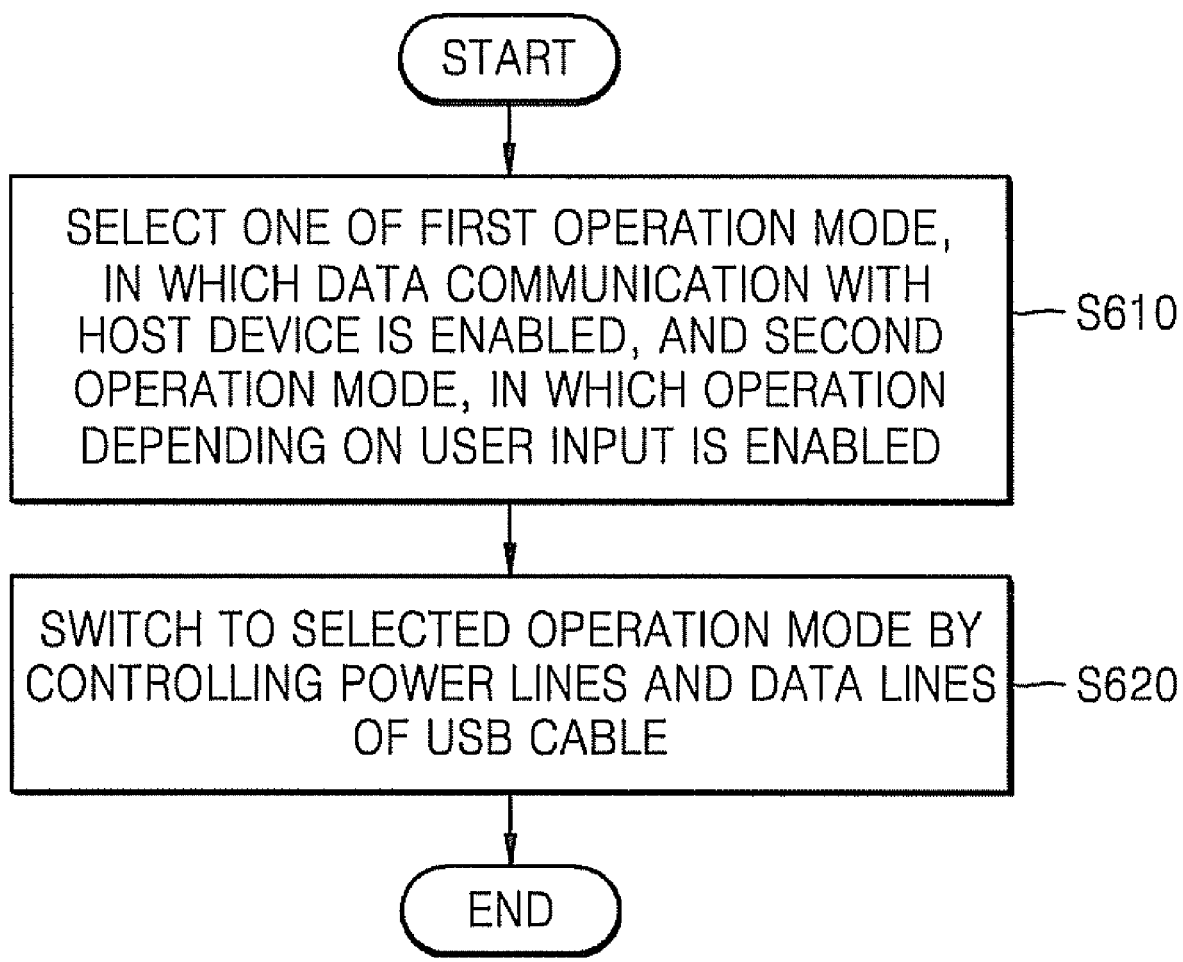
FIG. 6 is a flowchart of a routine of controlling a USB operation according to an embodiment of the present invention.

FIG. 6 is a flowchart of a routine of controlling a USB operation according to an embodiment of the present invention. In operation S610, a USB apparatus selects one of a first operation mode, in which data communication with a host device is enabled, and a second operation mode, in which an operation depending on a user input is enabled. The operation mode can be determined by a user input signal to select the first operation mode or the second operation mode.

In operation S620, switching to the selected operation mode is achieved by controlling power lines $V_{BUS}$ and GND and data lines D+ and D− of a USB cable according to the selection signal.

Switching from the first operation mode to the second operation mode (operation S620) may include outputting a signal to disconnect the data lines D+ and D−; outputting a signal to disconnect the power lines $V_{BUS}$ and GND after a predetermined time period elapses; and outputting a signal to re-connect the power lines $V_{BUS}$ and GND if the data lines D+ and D− and the power lines $V_{BUS}$ and GND have been disconnected. Switching from the second operation mode to the first operation mode (operation S620) may include outputting a signal to disconnect the power lines $V_{BUS}$ and GND; outputting a signal to re-connect the power lines $V_{BUS}$ and GND if the power lines $V_{BUS}$ and GND have been disconnected; and outputting a signal to connect the data lines D+ and D− after the predetermined time period elapses.

Figure 7:
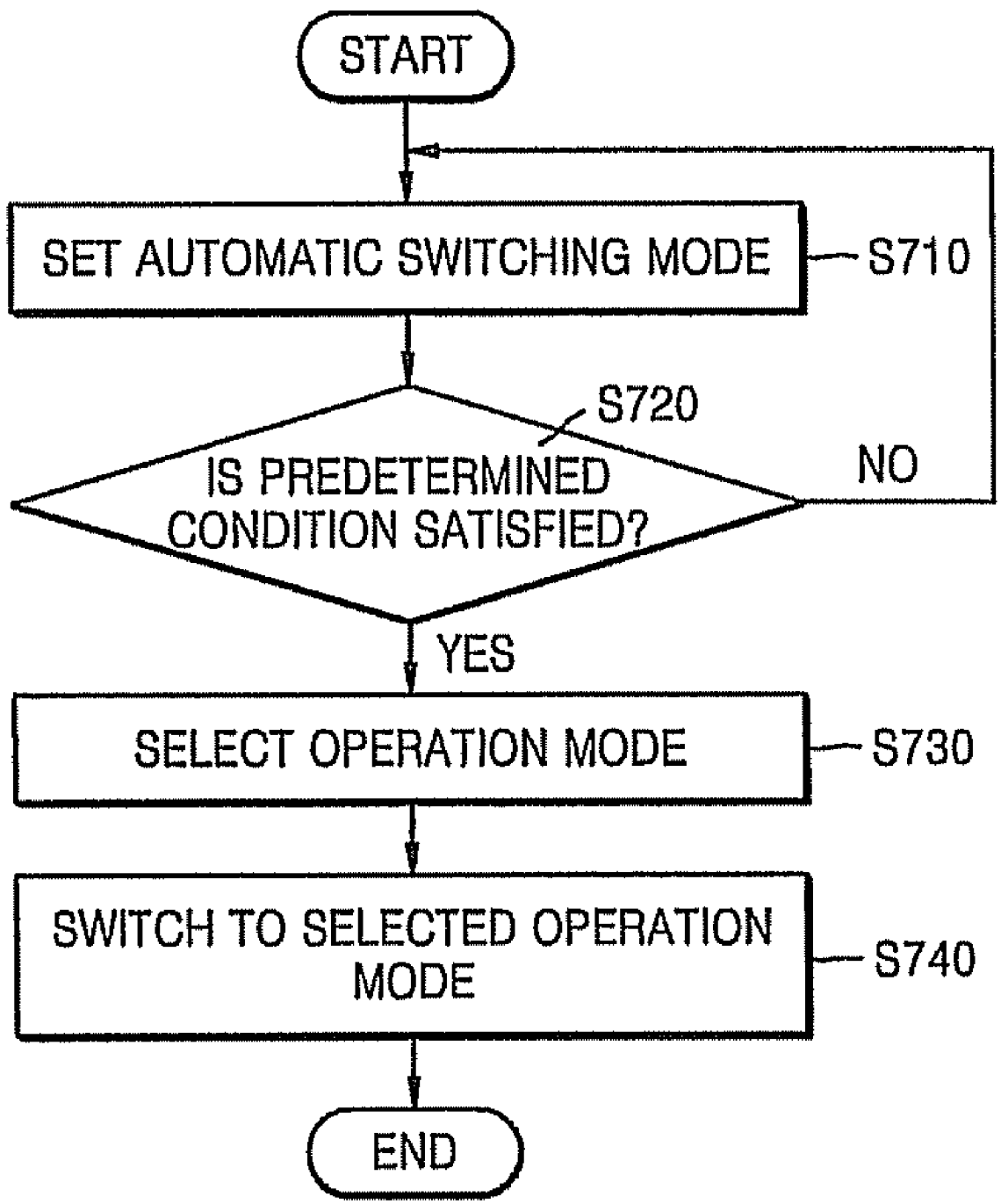
FIG. 7 is a flowchart of a routine of controlling a USB operation according to another embodiment of the present invention.

FIG. 7 is a flowchart of a routine of controlling a USB operation according to another embodiment of the present invention. An automatic switching mode is set in operation S710. For example, if a predetermined condition is satisfied, switching from the first operation mode to the second operation mode is achieved, and in the second operation mode, the automatic switching mode in which predetermined content is reproduced can be set by a user input signal.

It is determined in operation S720 whether the predetermined condition is satisfied. By way of example, the predetermined condition can be satisfied by detecting that data communication is completed or that a predetermined time has elapsed, or can be determined in various ways. Other aspects of the invention may include different predetermined conditions, such as a status of the host device 150, and different ways to determine whether the predetermined condition is satisfied.

For example, the predetermined condition may be set in the USB apparatus 300 or 500. The predetermined condition may be whether the data lines D+ and D− are being used for a predetermined time while the USB apparatus 300 or 500 is in the first operation mode. If the data lines D+ and D− have not been used for the predetermined time, the second operation mode can be selected so that switching to the second operation mode is achieved. The predetermined condition may be satisfied when a predetermined time period elapses. For example, if a predetermined time period has elapsed, a signal for switching from the first operation mode to the second operation mode may be generated.

If it is determined in operation S720 that the predetermined condition is satisfied, an operation mode selection signal to switch operation modes is generated in operation S730. Switching to an operation mode selected according to the operation mode selection signal is achieved in operation S740. A routine of switching from the first operation mode (or the second operation mode) to the second operation mode (or the first operation mode) is performed as described above. When switching from the first operation mode to the second operation mode, by reproducing predetermined content, an operation notifying a user that switching to the second operation mode has been achieved can be performed.

Techniques of controlling a USB apparatus according to aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The computer readable recording medium can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, when a user tries to operate a USB apparatus while maintaining a charge state from a host device during data communication with the host device via a USB cable, the user can easily operate the USB apparatus by means of a user input without unplugging the USB cable. In addition, when the user tries to perform data communication with the host device while operating the USB apparatus, the user can easily change an operation mode of the USB apparatus by controlling signals applied to the USB cable.

In addition, by allowing power to be supplied to the USB apparatus even in an operation mode for operating the USB apparatus, the user can use the USB apparatus for a long time. In addition, when switching from a first operation mode to a second operation mode, by reproducing and outputting predetermined content, i.e. recently downloaded content, the USB apparatus can allow the user to easily perceive that data communication with the host device has been completed. While described in terms of a USB connection, it is understood that the USB connection is not restricted to a particular USB version. In addition, aspects of the invention can be used in the context of non-USB connections and/or wireless connections.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Universal Serial Bus (USB) apparatus connectable to an external host device, the apparatus comprising:
   a USB connector to which a USB cable connected to the host device is connected; and
   a switching unit to switch between first and second operation modes by controlling power lines and data lines of the USB cable via the USB connector, the first operation mode being a mode in which data communication with the host device is enabled, and the second operation mode being a mode in which an operation depending on a user input is enabled and data communication with the host device is disabled;
   wherein power can be charged from the host device in both the first operation mode and the second operation mode, and
   wherein, when the switching unit switches from the first operation mode to the second operation mode, the data lines are disconnected, after a predetermined time period elapses after the data lines are disconnected, the power lines are disconnected, and once the data lines and the power lines have been disconnected, a signal to re-connecting the power lines is output.

2. The USB apparatus of claim 1, wherein, when the switching unit switches from the second operation mode to the first operation mode, the power lines are disconnected, a signal to re-connect the power lines is output when the power lines have been disconnected, and, a signal to connecting the data lines is output after a predetermined time period elapses after the power lines have been disconnected.

3. The USB apparatus of claim 1, further comprising:
   a user input unit to receive a user input signal;
   wherein the switching unit switches between the first and second operation modes by controlling the power lines and the data lines of the USB cable according to an operation mode selected by the user input signal.

4. A Universal Serial Bus (USB) apparatus connectable to an external host via a USB cable, the apparatus comprising:
   a USB connector to which the USB cable is connected, to connect the host device;
   a switching unit to control power lines and data lines of the USB cable via the USB connector; and
   a controller to control the switching unit to switch between a first operation mode in which data communication with the host device is enabled and a second operation mode in which an operation depending on a user input is enabled and data communication with the host device is disabled;
   wherein power is charged from the host device in both the first operation mode and the second operation mode, and when switching from the first operation mode to the second operation mode, the controller controls the switching unit to disconnect the data lines, to disconnect the power lines after a predetermined time period elapses after the data lines are disconnected, and to output a signal to re-connect the power lines if the data lines and the power lines have been disconnected.

5. The USB apparatus of claim 4, wherein, when switching from the second operation mode to the first operation mode, the controller controls the switching unit to disconnect the power lines, to output a signal to re-connect the power lines if the power lines have been disconnected, and to output a signal to connect the data lines after a predetermined time period elapses after the power lines have been disconnected.

6. The USB apparatus of claim 4, further comprising:
   a user input unit to receive a user input signal,
   wherein the controller controls the switching unit according to an operation mode selected by the user input signal.

7. The USB apparatus of claim 4, wherein the controller controls the switching unit to switch to one of the first and second operation modes when a predetermined condition is satisfied.

8. The USB apparatus of claim 7, wherein the controller determines that the predetermined condition is satisfied if the data lines are not used for a predetermined time while in the first operation mode.

9. The USB apparatus of claim 7, wherein the controller determines that the predetermined condition is satisfied if a predetermined time period elapses.

10. A method of controlling a Universal Serial Bus (USB) operation of a USB device connected to a host device via a USB cable, the method comprising:
    selecting one of a first operation mode in which data communication with a host device is enabled and a second operation mode in which an operation depending on a user input is enabled and data communication with the host device is disabled; and
    switching to a selected operation mode by controlling power lines and data lines of a USB cable,
    wherein power can be charged from the host device in both the first operation mode and the second operation mode, and
    wherein if the second operation mode is selected while operating in the first operation mode, the switching to the selected operation mode comprises:
    disconnecting the data lines of the USB cable;
    disconnecting the power lines of the USB cable after a predetermined time period elapses; and
    outputting a signal to re-connect the power lines, if the data lines and the power lines have been disconnected.

11. The method of claim 10, wherein if the first operation mode is selected while operating in the second operation mode, the switching to the selected operation mode comprises:
    disconnecting the power lines of the USB cable;
    outputting a signal to re-connect the power lines of the USB cable if the power lines have been disconnected; and
    after a predetermined time period elapses, outputting a signal to connect the data lines.

12. The method of claim 10, further comprising receiving a user input signal to select the first operation mode or the second operation mode.

13. The method of claim 10, wherein one of the first or second operation mode is selected if a predetermined condition is satisfied.

14. The method of claim 13, wherein the predetermined condition is satisfied if the data lines are not used for a predetermined period of time while in the first operation mode.

15. The method of claim 13, wherein the predetermined condition is satisfied if a predetermined time period elapses.

16. A computer readable recording medium storing a computer readable program for executing a method of controlling a Universal Serial Bus (USB) operation of a USB device connected to a host device via a USB cable, the method comprising:
    selecting one of a first operation mode in which data communication with a host device is enabled and a second operation mode in which an operation depending on a user input is enabled and data communication with the host device is disabled; and switching to a selected operation mode by controlling power lines and data lines of a USB cable, wherein power can be charged from the host device in both the first operation mode and the second operation mode, and wherein if the second operation mode is selected while operating in the first operation mode, the switching to the selected operation mode comprises:

disconnecting the data lines of the USB cable;

disconnecting the power lines of the USB cable after a predetermined time period elapses; and outputting a signal to re-connect the power lines, if the data lines and the power lines have been disconnected.

17. An apparatus connectable to an external host device, the apparatus comprising:

a housing;

a connector disposed at or in the housing, having data lines to transfer data between the apparatus and the host device and a power line to receive power from the host device; and a switching unit arranged within the housing to switch between a first operation mode in which data communication with the host device is enabled and a second operation mode in which an operation depending on user input is enabled and data communication with the host device is disabled, by controlling the power lines of the USB connector;

wherein power is charged from the host device in both the first operation mode and the second operation mode, and wherein, when switching from the first operation mode to the second operation mode, the controller controls the switching unit to disconnect the data lines, to disconnect the power lines after a predetermined time period elapses after the data lines are disconnected, and to output a signal for re-connecting the power lines if the data lines and the power lines have been disconnected.

18. The apparatus of claim 17, further comprising a controller to control the switching unit to switch between the first operation mode and the second operation mode.

19. The apparatus of claim 18, wherein, when switching from the second operation mode to the first operation mode, the controller controls the switching unit to disconnect the power lines, to output a signal to re-connect the power lines if the power lines have been disconnected, and to output a signal to connect the data lines after a predetermined time period elapses after the power lines are disconnected.

20. The apparatus of claim 18, wherein the controller controls the switching unit to switch to an operation mode when a predetermined condition is satisfied.

21. The apparatus of claim 20, wherein the controller determines that the predetermined condition is satisfied when the data lines are not used for a predetermined period of time while in the first operation mode.

22. The apparatus of claim 20, wherein the controller determines that the predetermined condition is satisfied when a predetermined time period elapses.

23. The apparatus of claim 17, further comprising:

a user input unit attached to, or arranged within, the housing to receive a user input signal;

wherein the controller controls the switching unit according to an operation mode selected by the user input signal.

24. The apparatus of claim 23, wherein the user input unit is not a component of the host device.

25. The apparatus of claim 17, wherein the USB apparatus is a portable media device.

26. The apparatus of claim 17, wherein the apparatus is a docking station to which a portable device is detachably connected to be charged and to selectively transfer data with respect to the host device.

* * * * *